United States Patent [19]

Kim

[11] Patent Number: 5,787,210
[45] Date of Patent: *Jul. 28, 1998

[54] POST-PROCESSING METHOD FOR USE IN AN IMAGE SIGNAL DECODING SYSTEM

[75] Inventor: Sang-Ho Kim, Seoul, Rep. of Korea

[73] Assignee: Daewood Electronics, Co., Ltd., Seoul, Rep. of Korea

[*] Notice: The term of this patent shall not extend beyond the expiration date of Pat. No. 5,555,029.

[21] Appl. No.: 532,035

[22] Filed: Sep. 22, 1995

[30] Foreign Application Priority Data

Oct. 31, 1994 [KR] Rep. of Korea .................. 94-28268

[51] Int. Cl.⁶ .................. G06K 9/03; G06K 9/00; H04N 17/02; H04N 11/04
[52] U.S. Cl. .................. 382/309; 382/233; 382/235; 348/409; 348/420
[58] Field of Search .................. 380/49; 382/262, 382/309, 26 D, 233, 235; 348/607, 409, 420

[56] References Cited

U.S. PATENT DOCUMENTS

| | | | |
|---|---|---|---|
| 5,367,385 | 11/1994 | Yuan | 348/420 |
| 5,384,849 | 1/1995 | Jeong | 382/268 |
| 5,555,028 | 9/1996 | Kim | 382/268 |
| 5,555,029 | 9/1996 | Kim | 382/268 |
| 5,565,921 | 10/1996 | Sasaki et al. | 348/409 |
| 5,578,051 | 11/1996 | Murakami et al. | 348/409 |

OTHER PUBLICATIONS

Staffan Ericsson, "Fixed and Adaptive Predictors for Hybrid Predictive/Transform Coding", *IEEE Transactions On Communications*, COM–33, No. 12, pp. 1291–1301 (Dec. 1985).

Ninomiya and Ohtsuka, "A Motion–Compensated Interframe Coding Scheme for Television Pictures", *IEEE Transactions*, COM–30, No. 1, pp. 201–210 (Jan. 1982).

Chen and Pratt, "Scene Adaptive Coder", *IEEE Transactions on Communications*, COM–32, No. 3, pp. 225–232 (Mar. 1984).

*Primary Examiner*—Andrew W. Johns
*Assistant Examiner*—Monica S. Davis
*Attorney, Agent, or Firm*—Pennie & Edmonds LLP

[57] ABSTRACT

A post-processing method for filtering decoded image signals determines positions of target pixels to be filtered and generates a selection signal indicating whether or not each of the target pixels belongs to a boundary region of a block of decoded image data. In response to the selection signal, each of the target pixel data is selectively filtered through the use of a filtering unit having two filters with different cutoff frequencies. An absolute difference value between filtered and non-filtered target pixel values is compared with a predetermined threshold value. The target pixel value is updated with the filtered target pixel value if the absolute difference value is smaller than the predetermined threshold value; otherwise, a compensated target pixel value is obtained by subtracting the predetermined threshold value from the non-filtered target pixel value or adding the non-filtered target pixel value and the predetermined threshold value, and, then the filtered target pixel value is updated with the compensated target pixel value.

4 Claims, 3 Drawing Sheets

POST-PROCESSING METHOD FOR USE IN AN IMAGE SIGNAL DECODING SYSTEM

FIELD OF THE INVENTION

The present invention relates to a post-processing method for use in an image signal decoding system; and, more particularly, to a method capable of removing a blocking effect present at the boundary of a block of decoded image data by effectively post-processing the decoded image data, to thereby improve the quality of the image produced by the system.

DESCRIPTION OF THE PRIOR ART

In various electronic/electrical applications such as high definition television and video telephone systems, an image signal may need to be transmitted in a digitized form. When the image signal is expressed in the digitized form, there is bound to occur a large amount of digital data. Since, however, the available frequency bandwidth of a conventional transmission channel is limited, in order to transmit the image signal therethrough, the use of an image encoding system often becomes necessary to compress the large amount of digital data. Among various video compression techniques, the so-called hybrid coding technique, which combines temporal and spatial compression techniques together with a statistical coding technique, is known to be most effective.

Most hybrid coding techniques employ an adaptive inter/intra mode coding, orthogonal transform, quantization of transform coefficients, RLC(run-length coding), and VLC (variable length coding). The adaptive inter/intra mode coding is a process of selecting a video signal for a subsequent orthogonal transform thereof from either PCM(pulse code modulation) data of a current frame or DPCM (differential pulse code modulation) data adaptively, e.g., based on a variance thereof. The inter-mode coding, also known as the predictive method, which is based on the concept of reducing the redundancies between neighboring frames, is a process of determining the movement of an object between a current frame and its one or two neighboring frames, and predicting the current frame according to the motion flow of the object to produce an error signal representing the difference between the current frame and its prediction. This coding method is described, for example, in Staffan Ericsson, "Fixed and Adaptive Predictors for Hybrid Predictive/Transform Coding", *IEEE Transactions on Communications*, COM-33, No. 12, pp. 1291–1301 (December 1985); and in Ninomiya and Ohtsuka, "A Motion-Compensated Interframe Coding Scheme for Television Pictures", *IEEE Transaction on Communications*, COM-30, No. 1, pp. 201–210 (January 1982).

The orthogonal transform, which exploits the spatial correlationships between image data such as PCM data of the current frame or motion compensated DPCM data and reduces or removes spatial redundancies therebetween, converts a block of digital image data into a set of transform coefficients. This technique is described in, e.g., Chen and Pratt, "Scene Adaptive Coder", *IEEE Transactions on Communications*, COM-32, No. 3, pp. 225–232 (March 1984). By processing such transform coefficient data with quantization, zigzag scanning, RLC and VLC, the amount of data to be transmitted can be effectively compressed.

The encoded image data is transmitted through a conventional transmission channel to an image signal decoder of an image signal decoding system within a receiver, which performs a reverse process of the encoding operation to thereby reconstruct the original image data. The reconstructed image data or decoded image data may display an annoying artifact, e.g., a blocking effect wherein the border line of a block becomes visible at the receiver. Such blocking effect occurs because a frame is encoded on a block-by-block basis.

There have been proposed various types of post-processing techniques to reduce the blocking effect, thereby improving the quality of the decoded image data. These post-processing techniques generally employ a post-processing filter for further processing the decoded image data.

In the post-processing technique using the post-processing filter, the decoded image data is filtered on a pixel-by-pixel basis through the use of a low pass filter having a predetermined cutoff frequency. A post-processing technique which adopts the post-processing filter is disclosed in a commonly owned copending application, U.S. Ser. No. 08/431,880, entitled "IMPROVED POST-PROCESSING METHOD FOR USE IN AN IMAGE SIGNAL DECODING SYSTEM". This technique provides an improved performance of reducing the blocking effect at the boundary of a block of decoded image data by repeatedly post-processing it based on respective filtered image data. However, this post-processing technique performs the filtering operation of the decoded image data without considering the position of each pixel contained in the block; and, therefore, it may not be able to reduce the blocking effect completely at the boundary of the block.

Another type of post-processing technique is disclosed in a commonly owned U.S. Pat. No. 5,555,029, entitled "METHOD AND APPARATUS FOR POST-PROCESSING DECODED IMAGE DATA". In this scheme, pixel position information for each of target pixels to be filtered is first obtained, the pixel position information representing whether or not each of the target pixels belongs to a boundary region of a block corresponding to each target pixel included in the decoded image data. Thereafter, through the use of two filters having different cutoff frequencies, the target pixels are selectively filtered based on the pixel position information. Specifically, a target pixel located within the boundary region is filtered with a lower cutoff frequency, while a target pixel located outside of the boundary region is filtered with the higher cutoff frequency.

Even though it may be possible to reduce the blocking effect at the boundary of a block through the use of aforementioned post-processing technique, need has continued to exist for an effective method of further reducing the blocking effect in order to substantially improve the quality of the decoded image data.

SUMMARY OF THE INVENTION

It is, therefore, a primary object of the invention to provide a post-processing method for use in an image signal decoding system capable of considerably reducing or eliminating the blocking effect present at the boundary of a block of decoded image data through the use of a selective filtering and a pixel data correction technique.

In accordance with the invention, there is provided a method, for use in an image signal decoding system, for post-processing decoded image data of a current frame on a pixel-by-pixel basis, wherein the decoded image data is provided on a block-by-block basis from an image signal decoder included in the image signal decoding system, comprising the steps of: (a) storing the decoded image data of the current frame; (b) assigning each pixel value included in the stored decoded image data as a target pixel value in sequence, said target pixel value representing the value of a target pixel to be filtered, and producing position information representing the position of the target pixel; (c) generating a selection signal indicating whether or not the target pixel belongs to a boundary region of a block of the stored decoded image data by using the position information of the target pixel, wherein the boundary region denotes a region which includes pixels lying on the boundary of the block; (d) selectively filtering the target pixel value in response to the selection signal to thereby produce a filtered target pixel value; (e) calculating an absolute difference value between an original target pixel value and the filtered target pixel value, the original target pixel value representing a non-filtered target pixel value included in the decoded image data; (f) updating the stored target pixel value with the filtered target pixel value if the absolute difference value is smaller than a predetermined threshold value; (g) repeating said steps (b) to (f) for N times as long as the absolute difference value is smaller than the predetermined threshold value and updating the stored target pixel value with compensated target pixel value if the absolute difference value is equal to or larger than the predetermined threshold value, wherein the compensated target pixel value is provided by adding up the original target pixel value and the predetermined threshold value if the original target pixel value is smaller than the filtered target pixel value and by subtracting the predetermined threshold value from the original target pixel value if the original target pixel value is greater than the filtered target pixel value; and (h) repeating said steps (b) to (g) for a next target pixel until all the pixels in the current frame are post-processed.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENTS

Figure 1:
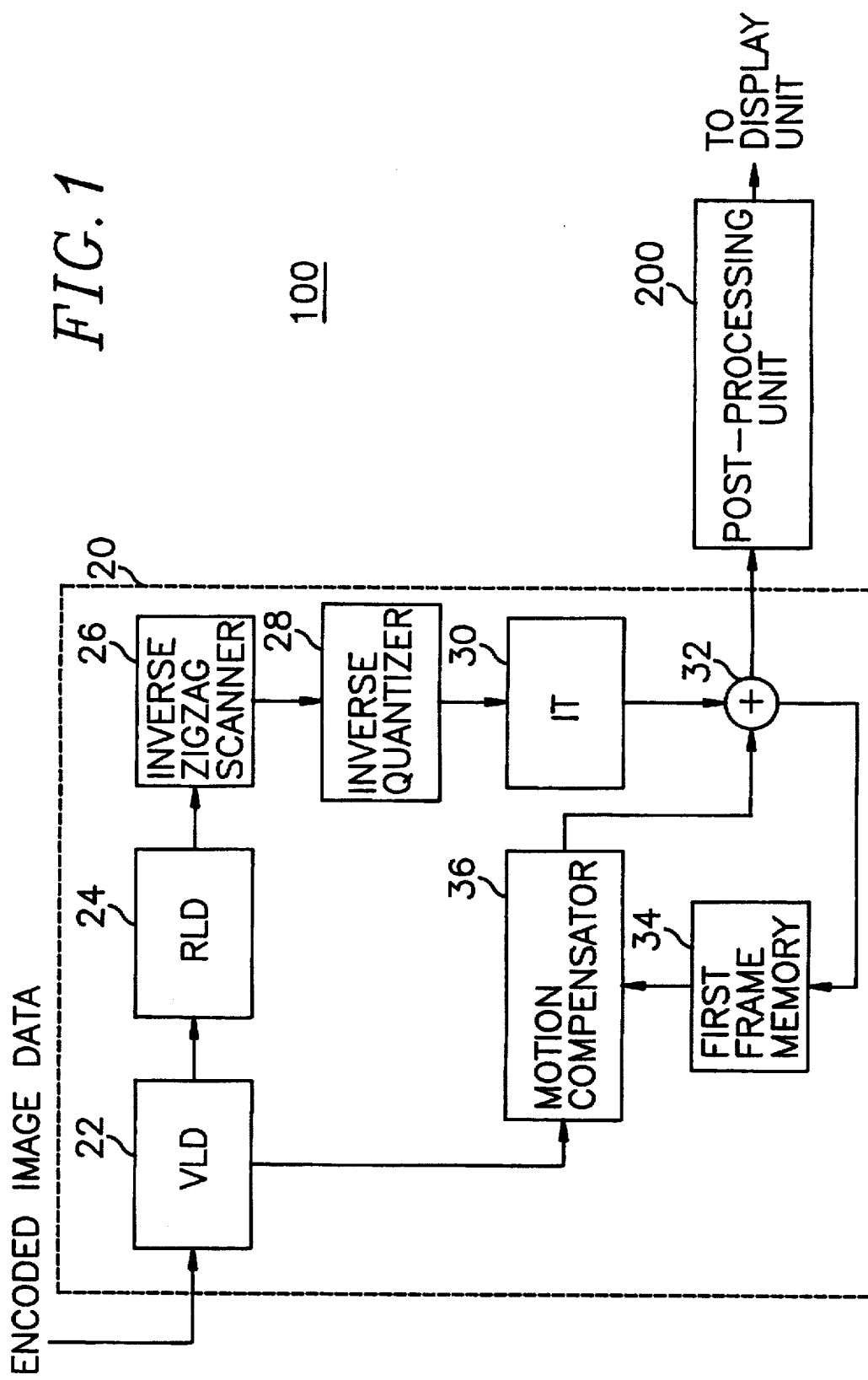
FIG. 1 shows a block diagram of an image signal decoding system employing a post-processing unit of the present invention.

Referring to FIG. 1, there is shown a novel image signal decoding system 100 for explaining the post-processing method of the present invention. The image signal decoding system 100 comprises an image signal decoder 20 and a post-processing unit 200, wherein the image signal decoder 20 includes a variable length decoder(VLD) 22, a run-length decoder(RLD) 24, an inverse zigzag scanner 26, an inverse quantizer(IQ) 28, an inverse transformer(IT) 30, an adder 32, a first frame memory 34 and a motion compensator 36.

In the image signal decoder 20, encoded image data, i.e., a set of variable length coded transform coefficients and motion vectors, is provided to the VLD 22 on a block-by-block basis. The VLD 22 serves to decode the set of variable length coded transform coefficients and the motion vectors to provide the run-length coded transform coefficients thereof to the RLD 24 and the motion vectors to the motion compensator 36, respectively. The VLD 22 is basically a look-up table: that is, in the VLD 22, a plurality of code sets is provided to define the respective relationships between the variable length codes and their run-length codes or motion vectors. Thereafter, the run-length coded transform coefficients are applied to the RLD 24, which is also a look-up table, for generating zigzag scanned transform coefficients. The zigzag scanned transform coefficients are then provided to the inverse zigzag scanner 26.

At the inverse zigzag scanner 26, the zigzag scanned transform coefficients are reconstructed to provide blocks of quantized transform coefficients. Each block of quantized transform coefficients is then converted into a set of transform coefficients at the IQ 28. Subsequently, the set of transform coefficients is fed to the IT 30, e.g., inverse discrete cosine transformer, which transforms the set of transform coefficients into a set of difference data between a block from a current frame and its corresponding block from a previous frame. The set of difference data is then sent to the adder 32.

In the meanwhile, the motion compensator 36 extracts a set of pixel data from the previous frame stored in the first frame memory 34 based on a motion vector, which corresponds to each block of the current frame, from the VLD 22 and provides the set of extracted pixel data to the adder 32. The set of extracted pixel data from the motion compensator 36 and the set of pixel difference data from the IT 30 are then summed up at the adder 32 to thereby provide reconstructed image data of a given block of the current frame. Thereafter, the reconstructed image data or decoded image data of the block is supplied to the first frame memory 34 for the storage thereof and the post-processing unit 200 for the post-processing thereof.

At the post-processing unit 200 of the present invention, post-processing of the decoded image data from the adder 32 is carried out to effectively filter the decoded image data; and, thereafter, the post-processed image data is transmitted to a display unit(not shown).

Figure 2:
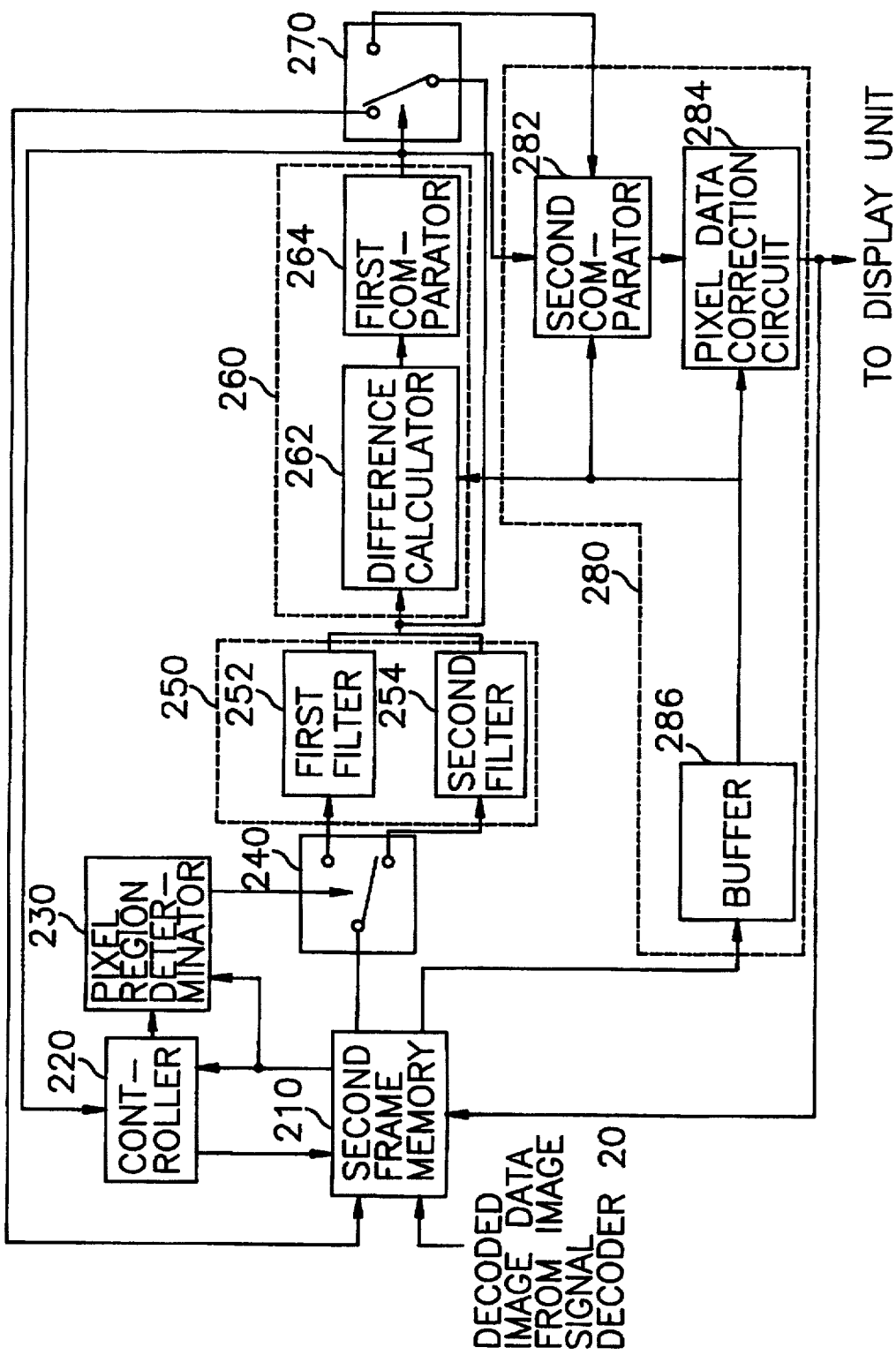
FIG. 2 represents a detailed block diagram of the post-processing unit shown in FIG. 1.

Turning now to FIG. 2, there is illustrated a detailed block diagram of the post-processing unit 200 shown in FIG. 1 for explaining the post-processing scheme of the present invention.

The post-processing unit 200, which comprises a filtering unit 250, a pixel data evaluation unit 260 and a pixel data correction unit 280, serves to provide the post-processed image data of the decoded image data by filtering each of the pixels included therein on a pixel-by-pixel basis.

As shown in FIG. 2, the decoded image data of the current frame from the image signal decoder 20 shown in FIG. 1 is first applied to a second frame memory 210 for the storage thereof. In response to a first control signal CS1 from a controller 220, a pixel value of a target pixel is retrieved from the second frame memory 210 and provided to the controller 220, a pixel region determinator 230, and a buffer 286 in the pixel data correction unit 280, while the pixel values for its neighboring N×N, e.g., 3×3, pixels are fed to a first switching circuit 240, wherein the target pixel denotes the pixel to be filtered and is located at the center of the N×N pixels, N being a positive integer. Thereafter, position information corresponding to the target pixel is generated from the controller 220 and sent to the pixel region determinator 230 which is adapted to determine a region of the target pixel.

Figure 3:
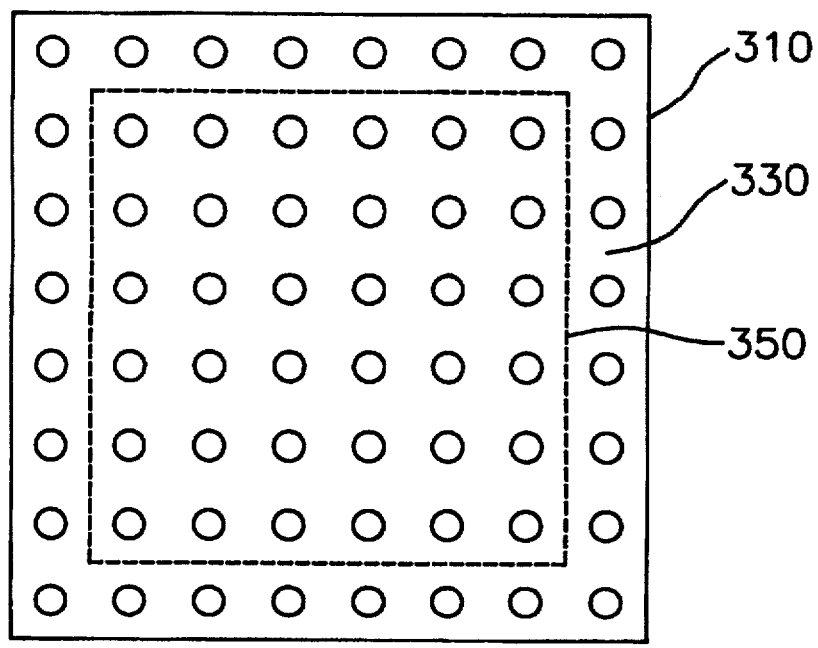
FIG. 3 presents an exemplary diagram explaining how a region for each target pixel included in decoded image data is defined.

Using the position information of the target pixel provided from the controller 220, the pixel region determinator 230 generates a first selection signal Si indicating whether or not the target pixel from the second frame memory 210 belongs to a boundary region of a block corresponding to the target pixel included in the stored decoded image data. As illustrated in FIG. 3, if the target pixel belongs to a boundary region, e.g., 330, of a block 310 having 8×8 pixels, the pixel region determinator 230 generates a logic high selection signal; and, if the target pixel does not belong to the boundary region 330, i.e., the target pixel exists outside the boundary region, e.g., 350 of the block 310, it generates a logic low selection signal. Thereafter, the selection signal generated at the pixel region determinator 230 is fed to the first switching circuit 240 in order to control the operation thereof.

In response to the selection signal from the pixel region determinator 230, the first switching circuit 240 selectively couples the N×N pixels including the target pixel provided from the second frame memory 210 to a first filter 252 or a second filter 254 of the filtering unit 250. Specifically, in response to the logic high selection signal, the N×N pixels are coupled to the first filter 252; and, in response to the logic low selection signal, the N×N pixels are connected to the second filter 254.

In a preferred embodiment of the present invention, the first filter 252 is adapted to filter the target pixel with a first predetermined cutoff frequency CF1 to thereby generate substantially filtered target pixel data, whereas the second filter 254 serves to filter the target pixel with a second predetermined cutoff frequency CF2 to thereby provide lesser filtered target pixel data than that from the first filter 252, wherein CF1<CF2. Each of the first and the second filters may be implemented by employing such digital filters as Median and Laplacian filters well known in the art.

It should be noted that the cutoff frequencies of the first and the second filters can be determined based on the required image quality of the image signal decoding system. The filtered target pixel data from the filtering unit 250 is fed to a difference calculator 262 included in the pixel data evaluation unit 260 and a second switching circuit 270. The difference calculator 262 serves to calculate a difference value between the original target pixel data stored in the buffer 286 and the filtered target pixel data from the filtering unit 250 and converts the difference value into its absolute value. The absolute difference value derived at the difference calculator 262 is then applied to a first comparator 264 also included in the pixel data evaluation unit 260.

The first comparator 264 compares the absolute difference value from the difference calculator 262 with a predetermined threshold value which may be pre-stored in a memory (not shown) thereof, to thereby provide a second selection signal S2 to the second switching circuit 270, the controller 220 and a second comparator 282 in the pixel data correction unit 280. That is, the first comparator 264 generates a logic high selection signal if the absolute difference value is equal to or larger than the predetermined threshold value; otherwise, it generates a logic low selection signal.

In the preferred embodiment of the invention, the predetermined threshold value can be determined based on the required image quality of the image signal decoding system, and is preferably set within a range from 4 to 8.

The second switching circuit 270, which is responsive to the S2 from the first comparator 264, selectively couples the filtered target pixel data from the filtering unit 250 to the pixel data correction unit 280 or the second frame memory 210. Specifically, in response to the logic high selection signal, the filtered target pixel data is coupled to the pixel data correction unit 280 which is adapted to correct the filtered target pixel data; and, in response to the logic low selection signal, the filtered target pixel data is coupled to the second frame memory 210 which is adapted for updating the stored target pixel data with the filtered target pixel data.

The pixel data correction unit 280, which includes the buffer 286, the second comparator 282 and a pixel data correction circuit 284, derives compensated target pixel data; and provides same to the display unit and the second frame memory 210, wherein the stored target pixel data is updated with the compensated target pixel data. That is, in response to the logic high selection signal, the second comparator 282 compares the filtered target pixel data from the filtering unit 250 via the second switching circuit 270 with the original, or non-filtered target pixel data from the buffer 286 and generates a compensation signal. Specifically, the second comparator 282 generates a logic high compensation signal if the non-filtered or original target pixel data is larger than the filtered target pixel data; otherwise, it generates a logic low compensation signal. The generated compensation signal from the second comparator 282 is provided to the pixel data correction circuit 284.

The pixel data correction circuit 284, in response to the compensation signal, provides the compensated target pixel data based on the non-filtered target pixel data from the buffer 286 and the predetermined threshold value, which is identical to the value pre-stored in the first comparator 264.

In the preferred embodiment of the present invention, if the input to the pixel data correction circuit 284 is a logic high compensation signal, the compensated target pixel data is obtained by subtracting the predetermined threshold value from the non-filtered target pixel data; and if the input thereto is a logic low compensation signal, it is derived by adding the non-filtered original target pixel data to the predetermined threshold value.

The controller 220, responsive to the S2 from the first comparator 264, controls the filtering process of the target pixel. That is, in response to the logic high selection signal, the controller 220 generates a second control signal CS2 to the second frame memory 210 to thereby update the stored target pixel data in the second frame memory 210 with the compensated target pixel data from the pixel data correction circuit 284; and provides a pixel value for a next target pixel from the second frame memory 210 to the buffer 286 and N×N pixel data encompassing the next target pixel to the first switching circuit 240.

On the other hand, if the first comparator 264 issues the logic low selection signal, the controller 220 generates a third control signal CS3 to the second frame memory 210 in order to update the stored target pixel data with the filtered target pixel data from the second switching circuit 270; and the filtering operation for the target pixel is repeated by providing N×N pixel data including the updated target pixel value from the second frame memory 210 to the first switching circuit 240. During the repeated filtering operation for the target pixel, the original target pixel data stored in the buffer 286 is not updated with the filtered target pixel data. The filtering operation for the target pixel is repeated until the first comparator 264 issues the logic high selection signal or the number of the logic low selection signals issued by the first comparator 264 reaches a predetermined number. In case the number of the logic low selection signals reaches the predetermined number, the controller 220 issues a fourth control signal CS4 to the second frame memory 210 to thereby update the stored target pixel data with the filtered target pixel data from the second switching circuit 270 and provide the updated target pixel data to the display unit. The predetermined number is preferably set as 2, 3 or 4. The image quality of the image signal decoding system depends on the predetermined number: that is, the image quality becomes better with a larger repeating number at the expense of processing time. Subsequently, the controller 220 provides a fifth control signal CS5 to the second frame memory 210 to thereby provide the next target pixel data to the buffer 286 and corresponding N×N pixel data encompassing the next target pixel to the first switching circuit 240.

As shown above, therefore, the present invention is capable of substantially reducing or eliminating blocking effects that may be present at the boundary of a block of decoded image data through the use of a selective filtering and pixel data correction technique, thereby improving the quality of the image in the system.

While the present invention has been shown and described with respect to the particular embodiments, it will be apparent to those skilled in the art that many changes and modifications may be made without departing from the spirit and scope of the invention as defined in the appended claims.

What is claimed is:

1. A method, for use in an image signal decoding system, for post-processing decoded image data of a current frame on a pixel-by-pixel basis, wherein the decoded image data is provided on a block-by-block basis from an image signal decoder incorporated in the image signal decoding system, comprising the steps of:

(a) storing the decoded image data of the current frame;

(b) assigning each pixel value included in the stored decoded image data as a target pixel value in sequence, said target pixel value representing the value of a target pixel to be filtered, and producing position information representing the position of the target pixel;

(c) generating a selection signal indicating whether or not the target pixel belongs to a boundary region of a block of the stored decoded image data by using the position information of the target pixel, wherein the boundary region denotes a region which includes pixels placed along the boundary of the block;

(d) selectively filtering the target pixel value in response to the selection signal to thereby produce a filtered target pixel value;

(e) calculating an absolute difference value between an original target pixel value and the filtered target pixel value, the original target pixel value representing a non-filtered target pixel value included in the decoded image data;

(f) updating the stored target pixel value with the filtered target pixel value if the absolute difference value is smaller than a predetermined threshold value;

(g) repeating said steps (b) to (f) for N times as long as the absolute difference value is smaller than the predetermined threshold value and updating the stored target pixel value with a compensated target pixel value if the absolute difference value is equal to or larger than the predetermined threshold value, wherein the compensated target pixel value is provided by adding up the original target pixel value and the predetermined threshold value if the original target pixel value is smaller than the filtered target pixel value and by subtracting the predetermined threshold value from the original target pixel value if the original target pixel value is greater than the filtered target pixel value; and (h) repeating said steps (b) to (g) for a next target pixel until all the pixels in the current frame are post-processed.

2. The method according to claim 1, wherein said step (d) for selectively filtering the target pixel value is carried out by using Median filters with different cutoff frequencies.

3. A method, for use in an image signal decoding system, for post-processing decoded image data of a current frame on a pixel-by-pixel basis, each pixel having an original pixel value, wherein the decoded image data is provided on a block-by-block basis from an image signal decoder incorporated in the image signal decoding system, said method comprising the steps of:

(a) determining whether a particular pixel in a block belongs to a boundary region of that block, wherein the boundary region denotes a region which includes pixels placed along the boundary of the block;

(b) selectively applying one of a first and a second filter, conditioned solely on whether or not that particular pixel belongs to a boundary region of the block, thereby resulting in a filtered pixel value;

(c) calculating an absolute difference between the original pixel value and the filtered pixel value of that particular pixel;

(d) updating the pixel value of that particular pixel in the following manner:
      (d1) assigning to that particular pixel, the filtered pixel value, if the absolute difference is less than a predetermined threshold value;
      (d2) assigning to that particular pixel, the original pixel value plus the predetermined threshold value, if the filtered pixel value exceeds the original pixel value by at least the predetermined threshold value; and
      (d3) assigning to that particular pixel, the original pixel value minus the predetermined threshold value, if the filtered pixel value is less than the original pixel value by at least the predetermined threshold value;

(e) repeating steps (b)–(d) up to a predetermined number of times so long as the absolute difference is less than the predetermined threshold; and (f) repeating steps (a)–(e) until all pixels in the block are post-processed.

4. The method of claim 3, wherein the first and second filters are Median filters having different cutoff frequencies.

* * * * *